Patented Mar. 29, 1932

1,851,954

UNITED STATES PATENT OFFICE

THEODORE WILLIAMS DIKE, OF NEW WESTMINSTER, BRITISH COLUMBIA, CANADA, ASSIGNOR TO I. F. LAUCKS, INC., OF SEATTLE, WASHINGTON, A CORPORATION OF WASHINGTON

PROCESS OF GLUING

No Drawing. Application filed September 29, 1931, Serial No. 565,929, and in Canada March 3, 1930.

This invention relates to the art of gluing, and, more particularly to processes for the formation of plywood.

The present application is a continuation in part of the co-pending applications of Theodore Williams Dike, Serial No. 335,998, filed January 29, 1929, and renewed March 10, 1931, Serial No. 455,977, filed May 26, 1930, Serial No. 456,813, filed May 28, 1930, and Serial No. 456,814, filed May 28, 1930, and renewed September 9, 1931.

An object of the invention is the provision of a simple and effective gluing procedure which is adapted for use under a wide variety of operating conditions, and which may be economically carried out.

A further object is the provision of a procedure whereby powdered adhesive bases may be readily and effectively utilized.

A wired variety of difficulties attend the use of "liquid glues." i. e., dispersions of adhesive base materials, in gluing procedures such, for example, as the formation of plywood or the like. Among such difficulties mention may be made of that form of bond failure known as a "starved joint", which may be caused, for example, by excessive mobility of the adhesive base in cases where the same is still in a fluid rather than in a plastic state at the time of applying bonding pressure; the complications in the gluing operation involved in the elimination of the water applied with the glue, staining; etc. Moreover, the use of hot press gluing is undesirable in certain instances because of the complications involved in the procedure, and of other difficulties.

With a view to reducing or eliminating the foregoing and other difficulties, the present invention contemplates a procedure involving the application to a surface to be incorporated of the adhesive-base material in discrete-particle form, there being also supplied an agent which assists in the bond-forming reactions at the glue line in the presence of a liquid, assembling and subjecting to pressure without transfer of heat from the plies to the glue line. It is to be understood, in referring to an agent which assists in the bond-forming reactions at the glue line in the presence of a liquid, that this term includes a plasticization-promoting agent which assists in imparting flow properties, in the presence of a liquefying medium, to a difficultly plasticizable adhesive, but excludes water or other purely liquefying medium contained in the plies or applied thereto. Preferably the adhesive base is applied in powdered form to a surface to be incorporated.

Among the adhesive materials which may be utilized, either singly or in combination, mention may be made of starch and starch-containing materials, casein, gluten, segregated or isolated protein from oil seeds such as soya bean, hempseed, castor bean, cottonseed, etc., flour or meal from the residue of oleaginous seeds, such as soya bean, hempseed, castor bean, cottonseed, peanuts, flaxseed, perillaseed, rapeseed, tung nuts, etc. from which the oil has been removed. These adhesives are of a character which are non-dispersible in water. It is to be understood in this connection that the term "non-dispersible" as used herein to describe adhesive materials does not exclude materials containing proportions of dispersible ingredients. In certain instances, moreover, adhesives which are disperisible in water, for example, blood albumin, egg albumen, etc. may be utilized.

Among the materials which may be utilized to assist in the bond-forming reactions at the glue line in the presence of a liquid under cold gluing conditions, caustic soda and other alkali metal hydroxides, for example, caustic potash, are particularly desirable for such use due to their rapid and effective action, as set forth in my co-pending application Serial No. 565,930 filed herewith and containing claims to the use of such substances. There may be employed, moreover, as likewise set forth and claimed in said application, material which will provide an alkali metal hydroxide for interaction with the adhesive base, for example, an alkali metal salt together with an alkaline earth hydroxide, for instance, sodium fluoride and lime, or a hydrolyzable alkali metal salt, for instance, borax or trisodium phosphate. Lime, barium hydroxide, ammonia and other alkaline materials may be utilized in some instances, as may also, in some cases, organic compounds such as phenol, and the cresols. In this connection reference is made to the co-pending application of Theodore Williams Dike, Serial No. 594,396, filed February 20, 1932, which is a continuation in part of the present case. Each of these materials assists in the plasticization of various adhesive materials, and various of them, including the alkaline re-agents, assist in the conversion in certain instances. In the use of adhesives of a character which is non-dispersible in water the effect of the agent in promoting plasticization and penetration is of particular value in a procedure such as contemplated.

The invention is adapted for use in the gluing of wood regardless of the moisture content thereof. It may, for example, be utilized in the gluing of wet or green veneer as it comes from the veneer cutter, as well as in the gluing of commercially dry veneer. In all cases the application of the adhesive in powdered form is of advantage, although in the gluing of dry wood with an adhesive base of a character which is non-dispersible in water the adhesive base may be added in the form of a suspension of discrete particles in water in some instances. In cases where sufficient moisture for the formation of the bond is not available from the wood, water may be added before and/or after the adhesive base, and with it in some instances.

The agent which assists in the bond-forming reactions at the glue line, as by promoting the plasticization and/or the conversion of the adhesive base, may be applied in a suitable manner, such, for example, as in admixture with the adhesive base or with water to be added, or independently of either, and in any desired order that the circumstances of the particular operation involved may dictate.

The members to be glued are associated, an adhesive base and other concomitant materials being suitably provided at each glue line, and the assembly subjected to pressure without transfer of heat to the glue line, as by pressing between cold plates for a suitable period.

The time factors involved in operations carried out in accordance with the invention may be varied considerably under different circumstances, but it is to be noted that satisfactory results have been obtained in accordance with the invention, using adhesive bases such as soya bean flour, casein, and blood, by subjecting assemblies to cold pressure for as short a time as five minutes or even less.

It may be noted also that in the presence of certain materials, for example, caustic soda, a slight amount of heat may be generated at the glue line when the assembly is under pressure.

The pressure applied may be varied widely, depending upon the character of the wood and other factors, and may in general range from 40 pounds to 300 pounds per square inch. Pressure of 200 pounds per square inch gives satisfactory results in many instances.

When the panel contains excessive water this may be suitably eliminated as by drying under gentle heat.

It is to be understood that the invention contemplates the uniting of a member composed of arificial, as well as natural, wood with another member.

Since certain changes may be made in carrying out the above process without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described my invention, what I claim as new and desire to secure by Letters Patent, is:

1. A process of uniting a wood member with another member which comprises applying to a surface to be incorporated an adhesive base in discrete-particle form, supplying also a material which assists in the bond-forming reactions at the glue line in the presence of a liquid, assembling and subjecting to pressure without transfer of heat to the glue line.

2. A process of uniting a wood member with another member which comprises applying to a surface to be incorporated a powdered adhesive base, supplying also an agent which assists in the bond-forming reactions at the glue line in the presence of a liquid, assembling and subjecting to pressure without transfer of heat to the glue line.

3. A process of uniting a wood member with another member which comprises applying to a surface to be incorporated a proteinous adhesive base in discrete-particle form, supplying also an agent which assists in the bond-forming reactions at the glue line in the presence of a liquid, assembling and subjecting to pressure without transfer of heat to the glue line.

4. A process of uniting a wood member with another member which comprises applying to a surface to be incorporated a proteinous adhesive base in powdered form, supplying also an agent which assists in the bond-forming reactions at the glue line in the presence of a liquid, assembling and subjecting to pressure without transfer of heat to the glue line.

5. A process of uniting a wood member with another member which comprises applying in discrete-particle form to a surface to be incorporated a proteinous adhesive base of a character which is non-dispersible in water, supplying also an agent which assists in the bond-forming reactions at the glue line in the presence of a liquid, assembling and subjecting to pressure without transfer of heat to the glue line.

6. A process of uniting a wood member with another member which comprises applying in powdered form to a surface to be incorporated a proteinous adhesive base of a character which is non-dispersible in water, supplying also an agent which assists in the bond-forming reactions at the glue line in the presence of a liquid, assembling and subjecting to pressure without the transfer of heat to the glue line.

7. A process of uniting a wood member with another member which comprises applying in powdered form to a surface to be incorporated a vegetable proteinous adhesive base, supplying also an agent which assists in the bond-forming reactions at the glue line in the presence of a liquid, assembling and subjecting to pressure without the transfer of heat to the glue line.

8. A process of uniting a wood member with another member which comprises applying to a surface to be incorporated an oil-seed flour, supplying also an agent which assists in the bond-forming reactions at the glue line in the presence of a liquid, assembling and subjecting to pressure without the transfer of heat to the glue line.

9. A process of uniting a wood member with another member which comprises applying to a surface to be incorporated soya-bean flour, supplying also an agent which assists in the bond-forming reactions at the glue line in the presence of a liquid, assembling and subjecting to pressure without the transfer of heat to the glue line.

10. A process of uniting a wood member with another member, which comprises applying powdered casein to a surface to be incorporated, supplying also an agent which assists in the bond-forming reactions at the glue line, assembling and subjecting to pressure without transfer of heat to the glue line.

11. A process of uniting a wood member with another member which comprises applying in powdered form to a surface to be incorporated an albuminous adhesive base, supplying also an agent which assists in the bond-forming reactions at the glue line in the presence of a liquid, assembling and subjecting to pressure without the transfer of heat to the glue line.

12. A process of uniting a wood member with another member which comprises applying in powdered form to a surface to be incorporated a blood adhesive base, supplying also an agent which assists in the bond-forming reactions at the glue line in the presence of a liquid, assembling and subjecting to pressure without the transfer of heat to the glue line.

13. A process of uniting a wood member with another member which comprises applying in discrete-particle form to a surface to be incorporated an adhesive base of a character which is non-dispersible in water, supplying also a plasticization-promoting agent, assembling and subjecting to pressure without the transfer of heat to the glue line.

14. A process of uniting a wood member with another member, which comprises applying to a surface to be incorporated in discrete-particle form a vegetable adhesive base of the character which is non-dispersible in water, supplying also a plasticization-promoting agent, assembling and subjecting to pressure without transfer of heat to the glue line.

15. A process of uniting a wood member with another member which comprises applying in discrete-particle form to a surface to be incorporated a proteinous adhesive base of a character which is non-dispersible in water, supplying also a plasticization-promoting agent, assembling and subjecting to pressure without the transfer of heat to the glue line.

16. A process of uniting a wood member with another member which comprises applying in discrete-particle form a vegetable proteinous adhesive base, supplying also a plasticization-promoting agent, assembling and subjecting to pressure without the transfer of heat to the glue line.

17. A process of uniting a wood member with another member which comprises applying an oil-seed flour, supplying also a plasticization-promoting agent, assembling and subjecting to pressure without the transfer of heat to the glue line.

18. A process of uniting a wood member with another member which comprises applying soya-bean flour, supplying also a plasticization-promoting agent, assembling and subjecting to pressure without the transfer of heat to the glue line.

19. A process of uniting a wood member with another member which comprises applying powdered casein, supplying also a plasticization-promoting agent, assembling and subjecting to pressure without the transfer of heat to the glue line.

In testimony whereof I affix my signature.

THEODORE WILLIAMS DIKE.